Aug. 17, 1965  L. HOFFMANN  3,200,627
PIPE FLARING OR BELLING

Filed Dec. 12, 1961  3 Sheets-Sheet 2

INVENTOR
LEO HOFFMANN
BY

AGENT.

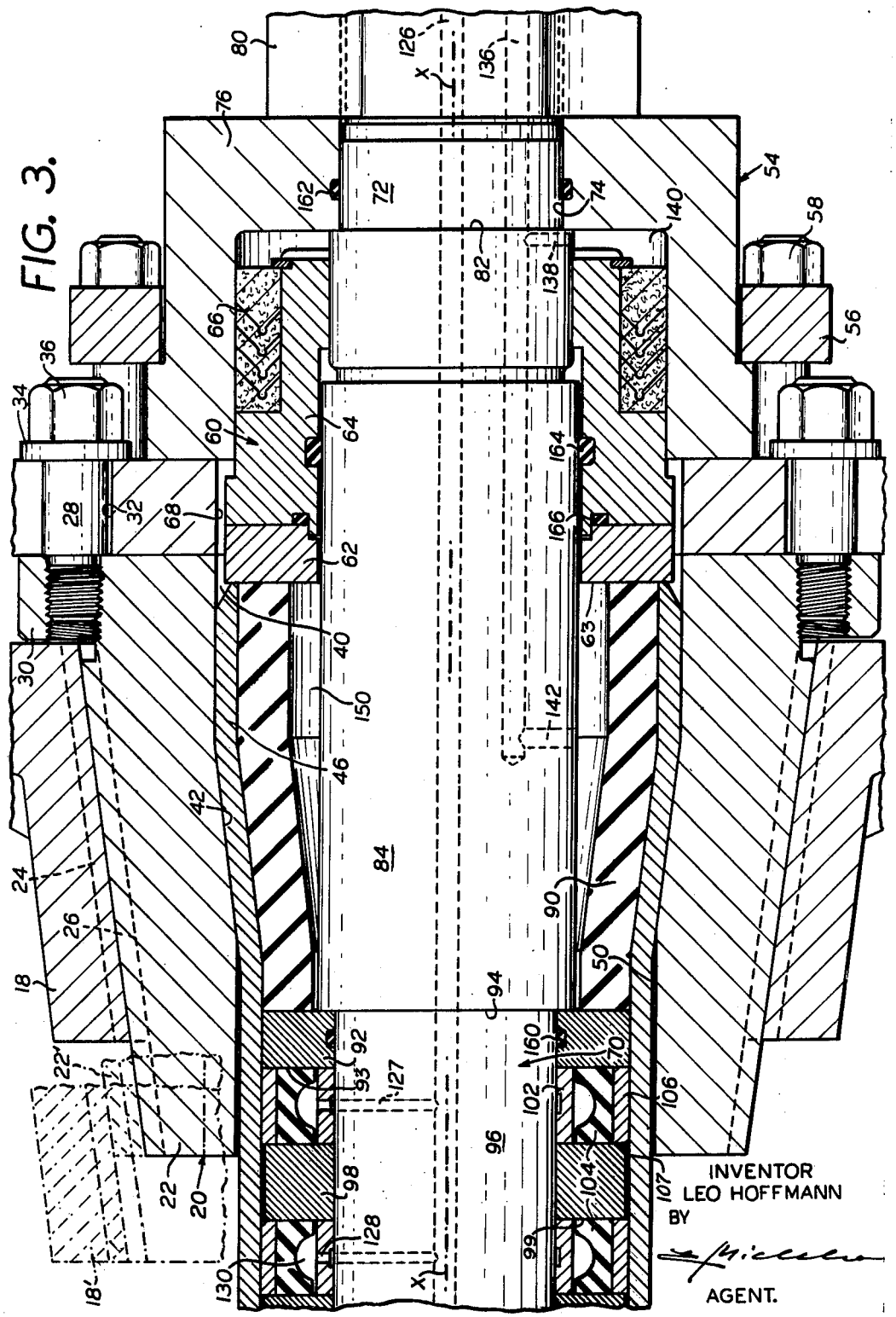

United States Patent Office 3,200,627
Patented Aug. 17, 1965

3,200,627
PIPE FLARING OR BELLING
Leo Hoffmann, New York, N.Y., assignor to Baldwin-Lima-Hamilton Corporation, a corporation of Pennsylvania
Filed Dec. 12, 1961, Ser. No. 158,769
6 Claims. (Cl. 72—61)

This invention relates to the shaping of pipes, and more particularly to the flaring or belling of pipe ends. Where hereinafter the term "flaring" appears alone, it should be understood to include "belling." The expression "pipe" as used herein refers generally to tubular material or articles.

Various apparatus are known for the flaring of pipe ends, but difficulties have been encountered in the application of previous designs to the shaping of pipes of relatively small diameter. This is true particularly in the case of mechanical devices such as mechanically operated expanding arbors since the latter must have a cross section of substantial size to accommodate required mechanical elements in the interior thereof. It should also be noted that the individual external shaping members of such arbors are separated by gaps at their circumference after expansion so that they will not impart a true circular shape to the pipe end to be treated.

The use of internal fluid pressure for the shaping of tubular bodies is well known in the art, but no simple and effective apparatus has heretofore been developed for the flaring of pipes in this manner, especially pipes of limited size.

Further it has often been found difficult to hold the pipe securely in place during shaping, without damaging a smooth finish or delicate coating on the outside of the pipe.

It is one of the objects of the invention to provide for the flaring of pipes in an improved manner and to facilitate the shaping operation in the case of pipes of relatively small diameter.

It is also an object of the invention to provide improved means for the clamping of pipes at their interior wall during flaring so that damage to the outer surface of the pipe or to an outer coating thereof will be avoided.

It is another object of the invention to provide an improved apparatus for flaring a pipe end by internal fluid pressure within a split die which when closed defines the true shape to be produced.

It is a different object of the invention to provide for both the clamping and flaring of pipe ends by means of a common source of pressure fluid so that upon variation of the shaping force, the clamping force will automatically be modified proportionally.

It is likewise an object of the invention to flare a pipe by a means of internal fluid pressure in a manner such that the pipe is securely clamped before the start of the flaring operation.

It is a further object of the invention to provide an improved pipe flaring apparatus which is compact and simple to operate.

Various other objects, features and advantages of the invention will become apparent as the description proceeds.

In the drawings which illustrate an embodiment of my invention by way of example, FIG. 1 is a longitudinal vertical section through an apparatus according to the invention, taken on line 1—1 of FIG. 2 but drawn on a smaller scale;

FIG. 3 shows a portion of FIG. 1, but illustrates the parts in another operative position on a large scale;

Figure 2:
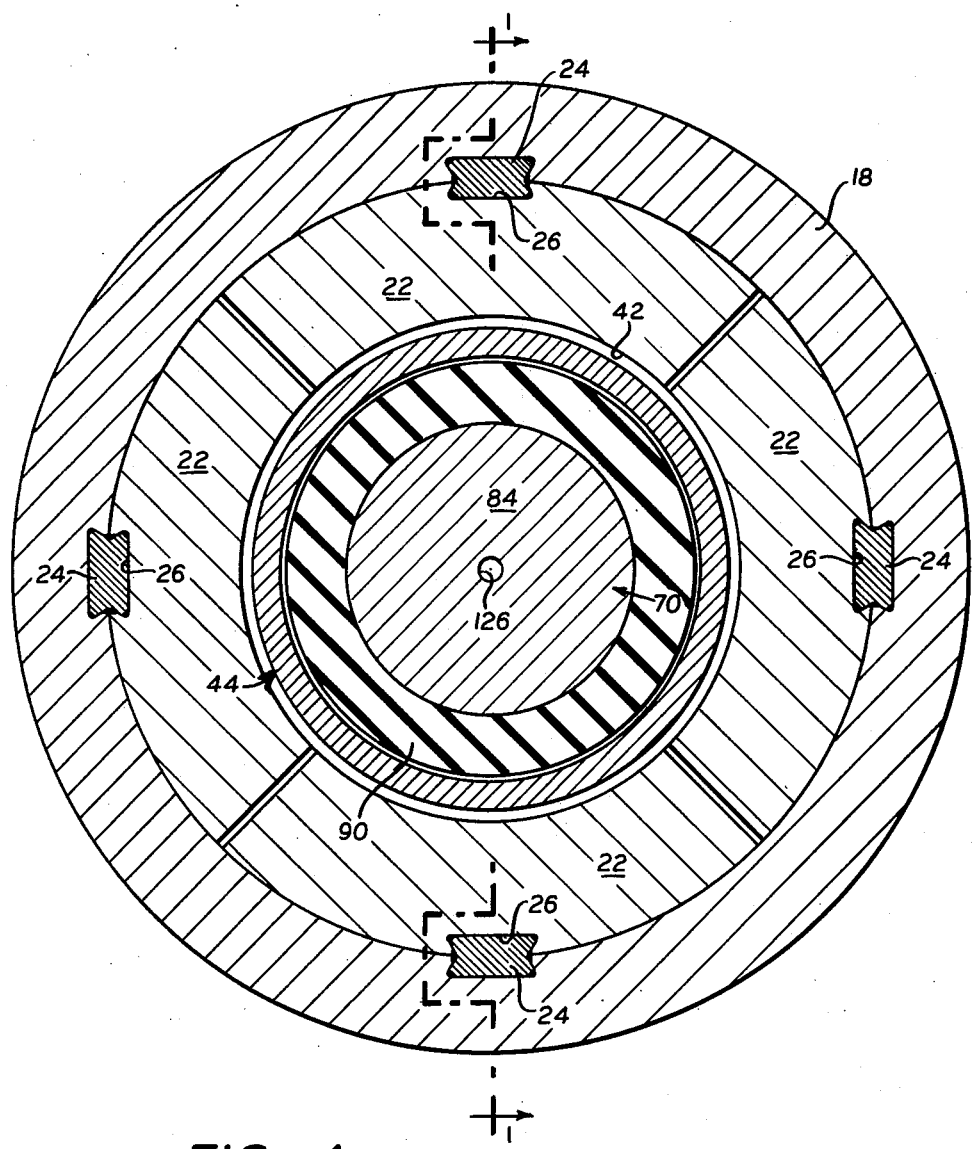
FIG. 2 is a transverse, large scale section taken on line 2—2 of FIG. 1.
Figure 4:
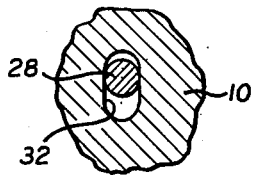
FIG. 4 is a fragmentary section taken on line 4—4 of FIG. 1 and illustrates a detail.

Referring now to the drawings, the apparatus shown therein comprises a mounting member or plate 10 which may either be in a fixed position or may be of the portable type, and which has a central axis X—X coordinated thereto. Secured to plate 10 are actuating means in the form of a pair of pneumatic or hydraulic motors 12 connected at 14 to lugs 16 of a frustro-conical die housing 18 which by means of the motors 12 is shiftable in the direction of the frustum axis which latter coincides with the axis X—X of plate 10. Housing 18 accommodates a coaxial, sectionalized die generally indicated at 20, which comprises four individual sections 22 guided in housing 18 by means of keys 24 (FIG. 2). The latter are of a double dove-tail shape and may be coextensive with, and fixed to, housing 18 while being slidable in corresponding keyways 26 of sections 22. To guide the die sections for movement transversely of the die axis, each section carries a stud 28 mounted in a flange portion 30, the stud extending through a slot 32 of elongated shape (FIG. 4) in plate 10 and having a washer 34 and nut 36 thereon. The die section 22 abut one side of plate 10 while the washers 34 engage the opposite side of the plate. It will be clear that when housing 18 is moved axially from its full line position to the chain line position 18' indicated in FIG. 3, the sections 22 will be caused to move radially outwardly to the position indicated in chain lines at 22' to open the die, and vice versa, the housing 18 and die sections 22 being tied together in substantially radial directions by the dove-tail shaped keys 24.

Die 20 has a cavity therein, generally indicated at 40, which is defined by the interior walls of the sections 22 when closed. The cavity includes a flaring or bell-shaped portion 42, the contour of which conforms to the desired shape to be imparted to a pipe, generally designated 44, at its end portion 46. The larger end of the flaring portion 42 is located adjacent plate 10 so that the smaller end is remote therefrom. To guide main pipe portion 48 which will remain unchanged, cavity 40 may further include a cylindrical portion or bore 50; and to facilitate the handling of the parts, the diameter of bore 50 may be somewhat larger than that of pipe 44 as introduced into the die.

A pressure fluid operated cylinder generally indicated at 54 is coaxially arranged on plate 10 and secured thereto by means of a retaining ring 56 and fastening means 58. An axially movable means in the form of a ram assembly generally indicated at 60 comprises a bolster ring 62 having a lateral annular plane face 63, a hollow ram 64, and a packing 66. The ram assembly is arranged to be operated by cylinder 54 and extends through a central opening 68 of mounting plate 10 to engage the terminal or front face of pipe end 46.

Coaxially secured to cylinder 54 is a mandrel or arbor generally indicated at 70, which has a neck portion 72 positioned in an opening 74 of cylinder head 76. The adjacent mounting end 78 of the mandrel is threaded and carries a nut 80 which cooperates with a shoulder 82 on the mandrel to fasten the latter to head 76. Mandrel 70 extends thorugh the hollow ram assembly 60 and the die cavity 40 into the bore of pipe 44 in cantilever fashion, the ram assembly being slidable on a mandrel portion 84 which for ease in mounting and dismounting of the parts is preferably larger in diameter than other portions of the mandrel.

An expandible sleeve 90 of resilient material such as rubber is positioned on mandrel portion 84 in the interior of pipe end 46 and laterally confined at one side by the bolster ring 62 serving as one abutment and at the other side by a guide ring 92 mounted on the mandrel and serving as a complementary abutment. Sleeve 90 is adapted to be inflated so as to bear against the inner wall of pipe end 46.

Guide ring 92 which has radially disposed lateral guide faces 93 (FIG. 3) engages a shoulder 94 on mandrel 70 and is positioned on a mandrel portion 96 of reduced diameter which extends through the pipe clamping area and carries a plurality of intermediate guide rings 98 having radially disposed lateral guide faces 99, and an end guide ring 100 having radially disposed lateral guide faces 101. Spacer rings 102 hold the guide rings apart and are relatively thin so that grooves are formed between the guide rings for accommodating expandable clamping rings 104 of resilient material such as rubber, the clamping rings serving at the same time as sealing elements in the spaces between guide rings. Each of the rings 104 is armored at its periphery with a plurality of individual ring segments 106 of preferably hardened metal adapted to engage the interior wall of pipe portion 48 to hold the pipe in place. The peripheral surfaces of ring segments 106 may either be smooth or may be serrated for increased gripping action, the lateral faces 107 of the segments being radially disposed for engagement with the respective adjacent lateral guide faces 93, 99 and 101. In other words, the faces 107 are parallel with and complementary to the guide faces 93, 99 and 101 which extend transversely of mandrel 70.

The free end 110 of mandrel 70 is, like the mounting end thereof, threaded and carries a nut 112 holding the assembly of guide rings 92, 98, 100 and spacer rings 102 in place and causing these parts to tightly bear against the mandrel shoulder 94.

A source of pressure fluid such as an accumulator or pump diagrammatically indicated at 120 is connected through a control valve 122 having conventional inlet and outlet ports, and through a ippe line 124 to a passage 126 in mandrel 70. The passage 126 has openings 127 aligned with openings 128 in the spacer rings 102 for communication with a purality of first or clamping chambers 130 located at the inner boundaries of the expandable rings 104. A pipe line 132 branches off line 124 and is connected through a spring-loaded check valve 134 to a passage 136 in mandrel 70. The latter passage has an opening 138 for communication with a second chamber 140 located in cylinder 54, and a further opening 142 for communication with a third chamber 150 (FIG. 3) formed inside the expandible sleeve 90. A pipe line 152 includes a check valve 154 operating substantially without preloading or spring pressure, the line 152 serving to by-pass the check valve 134 for connection of passage 136 to exhaust. Sealing means such as O-rings 160, 162, 164, 166 are provided to prevent the escape of pressure fluid from the system.

Figure 1:
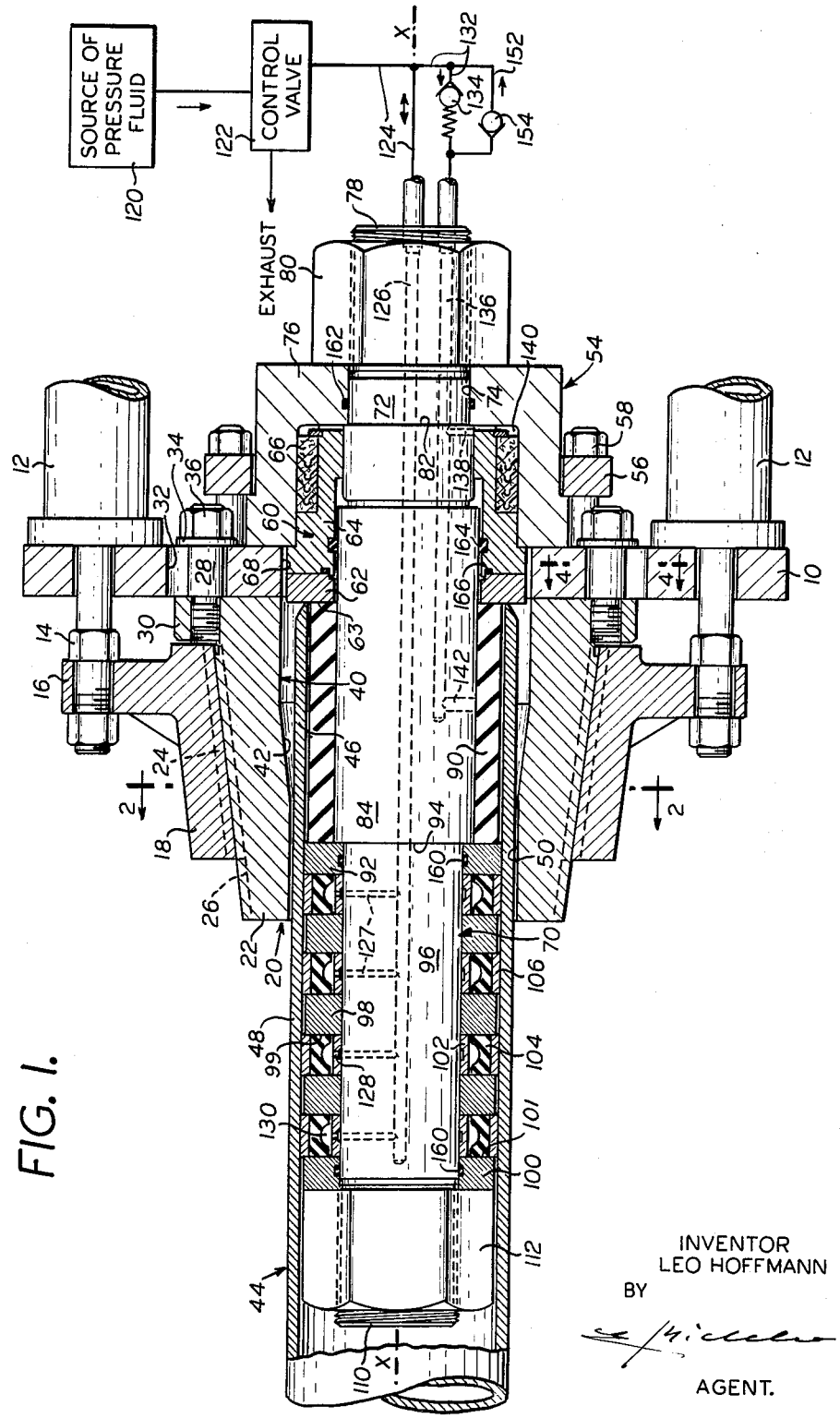

In operation, pipe 44 is arranged in die 20 and the die sections 22 are closed as shown in FIG. 1. Guide rings 98 and 100 may fit the interior of the pipe with some play to facilitate handling, but guide ring 92 preferably has a snug fit. When control valve 122 is adjusted to connect its inlet port and thus the source of pressure fluid 120 to pipe line 124 which communicates with passages 126, 127, 128, pressure will be applied to the chambers 130 so as to expand the clamping and sealing rings 104 and urge their armor segments 106 into engagement with the inner wall of portion 48 of the pipe to be treated. Check valve 134 is set to open at a predetermined minimum pressure, e.g. 60 p.s.i., and only after the pressure in the chambers 130 has been built up to this level and thus the pipe has been firmly gripped, will check valve 134 open and pressure fluid be allowed to enter passages 136, 138 and chamber 140 in cylinder 54, whereupon face 63 of the ram assembly 60 will be caused to bear firmly against the terminal face of pipe end 46. At the same time, pressure fluid will enter passage 142 and act upon sleeve 90 so as to expand the latter and force the pipe end 46 to conform to the contour of the flaring or bell-shaped portion 42 of cavity 40 as shown in FIG. 3. Extrusion of portions of the sleeve from the chamber 150 is prevented at one side by the ram assembly 60 exerting a sealing force upon the pipe end 46 and at the other side by the guide ring 92 fitting preferably snugly into the bore of pipe 44.

When the pipe contracts in its axial direction due to diametrical expansion, the ram assembly 60 will follow the receding pipe end and remain in engagement with the terminal face thereof under the pressure prevailing in chamber 140. To obtain the desired sealing force and proper follow-up movement, the effective diameter of ram 64 is slightly bigger than the largest internal diameter of the finished pipe end. Thus, the sealing force biasing ram 64 to the left in FIG. 3 will overcome back pressure acting in the opposite direction.

Further, a substantial axial force is applied to the pipe by the pressure in chamber 150 as soon as the pipe end begins to expand. This force which tends to shift the pipe towards the left in FIG. 3 is due to the action of pressure fluid upon the differential annular area defined by the internal diameter of the main pipe portion 48 and the internal diameter of the pipe end 46 as enlarged at the respective stage of the expansion. The latter force as well as the sealing force exerted on the pipe by the ram assembly 60 will be taken up by the armor segments 106 of the clamping means holding the pipe securely in place. These axial forces will be transmitted by lateral faces 107 of the segments 106 to guide rings 98 and 100, spacer rings 102, nut 112, mandrel 70, and cylinder 54 which is firmly supported on the mounting plate 10. In this way, the expandible rings 104 are relieved from axial forces, which will be beneficial to their sealing effect and will reduce wear. The conditions described exist in particular while the expansion proceeds, whereas at the end of the operation axial forces will be taken up substantially by die 20 as the pipe will then abut, and bear against, the flaring die portion.

Since the main portion 48 of the pipe is not enclosed at its periphery, the clamping stress applied thereto per unit of area should be kept safely below the level at which the pipe would start to expand in the clamping area, but the total gripping force should be sufficient to hold the pipe securely. This is accomplished by providing a suitable number of armored rings 104 and guide rings 98 and properly proportioning the axial length of the guide rings to the axial length of the armored rings. It should be noted that the radially acting clamping forces are proportionate to the axial length of the armored rings only, whereas the resistance to deformation of the pipe in the clamping area is a function of both the length of pipe sections surrounding the armored rings and the length of pipe sections surrounding the guide rings. In other words, pipe sections surrounding the guide rings will support adjacent sections against which gripping forces are applied by the armored rings 104. If the guide rings are of a sufficient length in their axial direction, the stresses in the gripped portions of the pipe will be substantially lower than the stresses produced in the pipe end 46 during expansion.

After the shaping operation has been completed, control valve 122 is adjusted so as to connect pipe line 124 to exhaust. Pressure fluid will be released from the chambers 130 through passage 126; and from chambers 140 and 150 through passage 136, by-pass 152 and check valve 154. This will result in deflation of the clamping rings 104 and sleeve 90, the ram assembly 60 being simultaneously relieved from pressure. Fluid motors 12 are now caused to shift die housing 18 from its full line position to the left in FIG. 3. Due to the effect of the connecting keys 24 in conjunction with the guide means 28, 32, 34, the individual die sections 22 will be drawn radially outwardly so that the parts will be in the open positions indicated in broken lines at 18' and 22' in FIG. 3. After the finished pipe has been removed from the open die, the apparatus is ready for the next flaring or belling operation.

It will be clear that the equipment described is suitable for handling pipes of limited diameter as the device is compact and only small fluid passages have to be accommodated in the interior of the mandrel. Since the flaring or belling takes place in the die when closed, the desired shape will be imparted to the pipe end in true form. It will further be apparent that my clamping means are adapted to hold the pipe securely in place, the gripping action starting before shaping forces are applied to the workpiece. With both the clamping and shaping forces derived from the same source of pressure fluid, the clamping force will remain proportional to the shaping force when the latter varies. As the clamping elements engage the pipe at its interior wall only, damage to the outer pipe surface or any delicate outer coating thereof is avoided.

Since the lateral annular face 63 extending from the bore of ring 62 to the outer periphery thereof and thus substantially from mandrel 70 to the interior surface of the die cavity 40 is plane throughout and free from grooves or the like, it is adapted to engage pipes of varying thickness.

The use of a continuous rubber sleeve such as shown at 90 will eliminate contact between pressure fluid and interior wall of the pipe, which is often of advantage. If admissible, however, individual sealing rings may be used adjacent the ram assembly 60 and guide ring 92, respectively, with the pressure fluid acting directly upon the wall of the pipe end 46.

Various other modifications and changes may be made without departing from the scope of my invention as defined in the appended claims.

What I claim is:

1. Apparatus for flaring an end of a pipe, comprising
   (a) a mounting member,
   (b) a die supported on said mounting member and having a cavity therein for receiving said end of the pipe; said cavity having a flaring portion, the contour of which conforms to the shape of the flared pipe end to be produced,
   (c) a mandrel supported on said mounting member so as to extend through the die and into the bore of pipe in said die,
   (d) pipe clamping means mounted on said mandrel for radial movement relative thereto into frictional engagement with the interior surface of said pipe, said clamping means being offset from said flaring cavity portion in the axial direction of the mandrel,
   (e) means for applying fluid pressure to said clamping means to urge the latter into engagement with the internal wall of the pipe in an area adjacent said pipe end and thereby hold said pipe in place,
   (f) means for applying fluid pressure to the interior of the pipe end to be flared to cause said end to conform to the contour of said flaring cavity portion, and
   (g) sealing means for engaging the interior surface of said pipe and preventing escape of pressure fluid therefrom, said sealing means being spaced from and mounted independently of said clamping means so as to minimize transmission of axial forces from said clamping means to said sealing means.

2. Apparatus for flaring an end of a pipe, comprising
   (a) a mounting member,
   (b) a die supported on said mounting member and having a cavity therein including a flaring portion, said flaring portion having a larger end located adjacent said mounting member and a smaller end being remote therefrom, the contour of said flaring cavity portion conforming to the shape of the flared pipe end to be produced,
   (c) an arbor having one of its ends supported on said mounting member with the other end projecting therefrom in cantilever fashion, said arbor extending through the die,
   (d) a pair of abutments on said arbor, one of said abutments being located near the smaller end of said flaring cavity portion and outside the confines thereof, and the other abutment being positioned adjacent the cantilever end of said arbor,
   (e) a plurality of spaced guide rings on said arbor between said pair of abutments, said guide rings having substantially radially disposed lateral faces,
   (f) spacer means between said guide rings in engagement therewith for positioning said guide rings and for transmitting forces acting in the axial direction of said arbor,
   (g) a plurality of resilient rings interposed between said guide rings and expandable radially of said arbor, each of said rings having a fluid chamber associated therewith at its inner boundary,
   (h) gripper segments secured to each of said resilient rings at the periphery thereof, said gripper segments having substantially radially disposed lateral faces for engaging said radially disposed lateral faces of said guide rings and transmitting axial forces thereto while substantially relieving said resilient rings from said forces,
   (i) a source of pressure fluid,
   (j) means connecting the source of pressure fluid to said chambers to expand the resilient rings and urge said gripper segments into engagement with the internal wall of the pipe to be treated for holding said pipe in position,
   (k) means connecting the source of pressure fluid to the interior of the pipe end to be flared for causing said end to conform to the contour of said flaring cavity portion, and
   (l) sealing means for preventing the escape of pressure fluid from said chambers and from the interior of said pipe end.

3. Apparatus for flaring an end of a pipe, comprising
   (a) a mounting member,
   (b) a die supported on said mounting member and having a cavity therein for receiving said end of the pipe; said cavity having a flaring portion, the contour of which conforms to the shape of the flared pipe end to be produced,
   (c) a mandrel supported on said mounting member so as to extend through the die and into the bore of pipe in said die,
   (d) at least one clamping member mounted on said mandrel for radial movement relative thereto, said clamping member being actuated by means of a first fluid chamber,
   (e) a ram assembly movable on said mandrel and including a lateral annular face for engaging the terminal face of the pipe end to be flared and exerting sealing pressure thereupon, said lateral annular face extending substantially from said mandrel to the interior surface of said die cavity and being plane throughout,
   (f) a cylinder supported on said mounting plate and having a second fluid chamber therein for operating said ram assembly,
   (g) means on the mandrel including said ram assembly for forming a third fluid chamber within the pipe end to be flared, and
   (h) a source of pressure fluid connectible to said three chambers for urging said clamping member into engagement with the internal wall of the pipe to be treated and thereby hold said pipe in position, further for causing said ram assembly to contact the terminal face of said pipe end throughout the shaping operation, and for forcing said pipe end to conform to the contour of said flaring cavity position.

4. A clamping device for gripping a pipe, comprising
   (a) an arbor movable relative to said pipe for insertion in the bore thereof in coaxial relationship therewith,
   (b) at least one pair of spaced guide means encompassing said arbor and secured against axial movement relative thereto, said pair of spaced guide means having lateral guide faces extending transversely of the arbor and defining a groove therebetween circumferentially of said arbor, (c) an inflatable resilient ring in said groove, (d) a plurality of gripper segments secured to the outer periphery of said resilient ring and having lateral complementary faces extending substantially parallel to said guide faces, said complementary faces being engageable with said lateral faces of the guide means for transmitting axially directed forces thereto and substantially relieving said resilient ring therefrom, and (e) means for applying fluid pressure to said resilient ring to urge the gripper segments thereof into engagement with the internal wall of said pipe.

5. Apparatus as defined in claim 3, wherein said ram assembly includes a ring having said lateral plane face thereon, said lateral plane face extending from the bore of said ring to the outer periphery thereof.

6. Apparatus for flaring an end of a pipe, comprising
(a) a mounting member,
(b) a die supported on said mounting member and having a cavity therein for receiving said end of the pipe; said cavity having a flaring portion, the contour of which conforms to the shape of the flared pipe end to be produced,
(c) a mandrel supported on said mounting member so as to extend through the die and into the bore of pipe in said die,
(d) at least one clamping member mounted on said mandrel for radial movement relative thereto, said clamping member being actuated by means of a first fluid chamber,
(e) a ram assembly on said mandrel for engaging the terminal face of the pipe end to be flared,
(f) a cylinder supported on said mounting plate and having a second fluid chamber therein for operating said ram assembly,
(g) means on the mandrel including said ram assembly for forming a third fluid chamber within the pipe end to be flared,
(h) a source of pressure fluid connectible to said three chambers for urging said clamping member into engagement with the internal wall of the pipe to be treated and thereby hold said pipe in position, further for causing said ram assembly to contact the terminal face of said pipe end throughout the shaping operation, and for forcing said pipe end to conform to the contour of said flaring cavity position, and
(i) means including a check valve for building up pressure in said first chamber to a predetermined degree before admitting pressure to said second and third chambers, whereby a clamping force of a selected magnitude is applied to said pipe prior to the start of its deformation; said mandrel having a passage therein for communication between the source of pressure fluid and said first chamber, and having an additional passage therein for communication between the source of pressure fluid and said second and third chambers; said check valve being arranged between the source of pressure fluid and said additional passage to establish communication therebetween at a predetermined minimum pressure level.

References Cited by the Examiner
UNITED STATES PATENTS

| | | | |
|---|---|---|---|
| 1,930,745 | 10/33 | Fisher | 153—79 |
| 1,998,047 | 4/35 | Farr | 29—523 |
| 2,299,116 | 10/42 | Svirsky | 138—90 |
| 2,458,854 | 1/49 | Hull et al. | 153—79 X |
| 2,526,210 | 10/50 | Edelmann | 153—79 |
| 2,610,651 | 9/52 | Hahn | 138—90 |
| 2,695,446 | 11/54 | Meyer | 29—523 |
| 2,870,794 | 1/59 | Thaxton | 138—90 |
| 2,941,568 | 6/60 | Ottestad et al. | 153—79 |
| 2,997,093 | 8/61 | Harris | 153—79 |

CHARLES W. LANHAM, *Primary Examiner.*